United States Patent [19]
Thörmer et al.

[11] Patent Number: 5,013,783
[45] Date of Patent: May 7, 1991

[54] HEAT-STABLE RUBBER COMPOSITIONS BASED ON HYDROGENATED NITRILE RUBBER

[75] Inventors: Joachim Thörmer; Ernst Rohde, both of Leverkusen, Fed. Rep. of Germany; Zsolt Szentivanyi, Tokyo, Japan

[73] Assignee: Bayer Aktiengesellschaft, Leverkusen-Bayerwerk, Fed. Rep. of Germany

[21] Appl. No.: 536,323

[22] Filed: Jun. 11, 1990

[30] Foreign Application Priority Data

Jun. 22, 1989 [DE] Fed. Rep. of Germany ........ 3920466

[51] Int. Cl.$^5$ ................................................ C08K 3/34
[52] U.S. Cl. ..................................... 524/450; 524/566
[58] Field of Search ................................ 524/444, 450

[56] References Cited

U.S. PATENT DOCUMENTS 3,036,980 5/1962 Dunham Jr. et al. ............... 524/450
3,832,327 8/1974 Hackbarth et al. ................. 524/450
4,612,342 9/1986 Kostinko ............................. 524/450

FOREIGN PATENT DOCUMENTS 1196849 11/1959 France .
2040900 9/1980 United Kingdom .

OTHER PUBLICATIONS

WPIL Database, JP-A-62240338, Derwent Publications Ltd., London, GB (10/21/87).

Primary Examiner—Joseph L. Schofer
Assistant Examiner—Mark Sweet
Attorney, Agent, or Firm—Connolly & Hutz

[57] ABSTRACT

Hydrogenated nitrile rubbers filled with sodium aluminium silicate suffer relatively little deterioration of the mechanical properties, e.g. elongation at break, during hot air aging.

6 Claims, No Drawings

HEAT-STABLE RUBBER COMPOSITIONS BASED ON HYDROGENATED NITRILE RUBBER

The invention relates to rubber compositions based on hydrogenated nitrile rubber which contain sodium aluminium silicate as a filler, a process for the preparation of these rubber compositions by mixing the components and the use of these rubber compositions for the production of vulcanization products.

The hydrogenation of nitrile rubber is known; U.S. Pat. No. 3,700,637, DE Pat. No. 2 539 132, 3 046 008, 3 046 251, 3 227 650, 3 329 974, EP-A 111 412 and FR-PS 2 540 503. Hydrogenated nitrile rubber is distinguished by a high tear strength, low wear, low permanent deformation following compressive and tensile stress and good resistance to oil, but above all by a remarkable stability towards thermal and oxidative influences.

To achieve good mechanical properties, such as tensile strength, elongation at break and moduli, reinforcing fillers, as a rule carbon blacks or mineral fillers, such as e.g. silicic acid, are added to elastomers; c.f. e.g. DE-OS 3 226 081.

Surprisingly, it has now been found that hydrogenated nitrile rubbers filled with sodium aluminium silicate undergo less deterioration in their mechanical properties (such as e.g. elongation at break) on ageing in hot air than hydrogenated nitrile rubbers containing other mineral fillers (such as precipitated or pyrogenically prepared silicon dioxide, talc, chalk, calcined kaolin, mica, diatomaceous earth, magnesium oxide and zinc oxide). These findings are qualitatively independent of the degree of vulcanization (that is to say also apply to non-vulcanized rubber compositions) and surprisingly also of the vulcanization system used.

The invention thus relates to rubber compositions based on hydrogenated nitrile rubbers, containing—based on the hydrogenated nitrile rubber—20 to 200, preferably 35 to 110 wt. % sodium aluminium silicate.

By "hydrogenated nitrile rubber" or "HNBR" in the sense of this invention there are to be understood nitrile rubbers in which the C=C double bonds are selectively (i.e. without hydrogenation of the C≡N triple bond) partly or completely hydrogenated. Preferred hydrogenated nitrile rubbers are those having a degree of hydrogenation, based on the C=C double bonds originating from the butadiene, of at least 80, preferably at least 95 and in particular at least 98%. The degree of hydrogenation can be determined by NMR and IR spectroscopy.

The hydrogenated nitrile rubbers are based on diene/(meth-)acrylonitrile copolymers. Isoprene and particularly butadiene are preferred dienes. The copolymers have a content of copolymerized acrylonitrile and/or methacrylonitrile units of 5 to 60, preferably 10 to 50 wt. %.

The hydrogenated nitrile rubbers as a rule have Mooney viscosities (DIN 53 523) of 10 to 150, preferably 25 to 80 (ML 1+4)/100° C.

Preferred sodium aluminium silicates contain, based on the product dried at 105° C., at least 3 wt. % $Na_2O$, at least 3 wt. % $Al_2O_3$ and at least 60 wt. % $SiO_2$ according to DIN 55 921/2, preferably 6 to 8 wt. % $Na_2O$, 6 to 8 wt. % $Al_2O_3$ and at least 75 wt. % $SiO_2$. They have a BET surface area of 60 to 70 $m^2/g$ and a pH (according to DIN 53 200) of 10 to 12. A preferred sodium aluminium silicate of this type is obtainable, for example, under the trade name ®Vulkasil A1 (Bayer AG, Leverkusen).

Customary auxiliaries, such as, for example, plasticizers, resins, factices and stabilizers, can of course also be added to the rubber compositions according to the invention in order to achieve certain properties in the crude mixture or vulcanization product. Silanes can be added as filler activators, in most cases 1 to 3 wt. %, based on the rubber, being sufficient.

The components can be mixed on the customary mixing units.

Preferred mixing units are the kneaders, mills, internal mixers and mixing extruders which are customary in the rubber industry and which as a rule operate at shearing rates of 1 to 1,000 $sec^{-1}$, preferably 2 to 200 $sec^{-1}$.

The invention thus furthermore relates to a process for the preparation of the rubber compositions described by mixing the components.

Possible crosslinking systems are all the systems known in rubber technology, such as sulphur crosslinking, peroxide crosslinking, urethane crosslinking, metal oxide crosslinking, resin crosslinking and combinations thereof. Sulphur and peroxide vulcanization are preferred.

Detailed descriptions of sulphur vulcanization systems are to be found in W. Hofmann, "Vulkanisation und Vulkanisationshilfsmittel (Vulcanization and Vulcanization Auxiliaries)", Verlag Berliner Union GmbH, Stuttgart 1965 and in Alliger and Sjothun, "Vulcanization of Elastomers", Reinhold Pub. Corp. New York 1964. Suitable sulphur donors include thiuram polysulphides, such as e.g. dipentamethylenethiuram tetra- and hexasulphide and tetramethylthiuram disulphide; amine disulphides, such as e.g. dimorpholyl disulphide; sodium polysulphides and thioplasts.

Preferred sulphur vulcanization systems contain
(a) sulphur or sulphur donors,
(b) if appropriate vulcanization accelerators and
(c) if appropriate one or more activators.

As a rule 0.2 to 3.0 wt. % sulphur (in the case of sulphur donors: calculatedas the sulphur liberated), based on the rubber, is used as the amount of (a).

The vulcanization accelerators (b) are in general used in amounts of 1 to 3.5 wt. %, based on the rubber. Preferred vulcanization accelerators (b) include thiazole accelerators, such as
2-mercaptobenzothiazole,
dibenzothiazyl disulphide,
benzothiazyl-2-cyclohexylsulphenamide (CBS),
benzothiazyl-2-tert.-butylsulphenamide (TBBS),
N-morpholinothio-2-benzothiazole (MBS),
benzothiazyl-2-diisopropylsulphenamide (DIBS),
benzothiazyl-2-tert.-amylsulphenamide (AMZ),
benzothiazyl-dicycohexylsulphenamide (DCBS) and
morpholino-thiocarbonyl-sulphenmorpholide (OTOS).

Other preferred vulcanization accelerators (b) include diphenylguanidine (DPG) and di-o-tolylguanidine (DOTG); thiurams, such as thiuram mono- and disulphides; and dithiocarbamates.

The most important activators (c) are the metal oxides, in particular zinc oxide. In individual cases, magnesium oxide or calcium hydroxide is also used.

Peroxides which are preferred for the peroxide vulcanization include
dialkyl peroxides,
ketal peroxides,
aralkyl peroxides,
peroxide ethers and peroxide esters, such as e.g.
di-tert.-butyl peroxide,
bis-(tert.-butylperoxyisopropyl)-benzene,
dicumyl peroxide,
2,5-dimethyl-2,5-di(tert.-butylperoxy)-hexane,
2,5-dimethyl-2,5-di(tert.-butylperoxy)-hex-3-ene,
1,1-bis(tert.-butylperoxy)-3,3,5-trimethyl-cyclohexane,
benzoyl peroxide,
tert.-butylcumyl peroxide and
tert.-butyl perbenzoate.

The amounts of peroxide are preferably in the range from 4 to 8 wt. %, based on the rubber.

The vulcanization can be carried out at temperatures from 100° to 200° C., preferably 130° to 180° C., if appropriate under a pressure of 10 to 200 bar. After the vulcanization, the vulcanization products can be conditioned by storage at elevated temperature.

The vulcanization can also be achieved by high-energy radiation.

"Vulcanized" in the sense of the invention means that on extraction for 10 hours in a Soxhlet attachment using toluene as the extracting agent, less than 10, preferably less than 5 wt. %, based on the rubber, can be extracted.

The invention furthermore relates to the use of the rubber compositions described for the production of vulcanization products.

The rubber compositions according to the invention and, preferably, the vulcanization products obtained therefrom can be used in the form of any conceivable shaped articles (hoses, seals, drive elements, such as toothed belts and V-belts, or cable sheathings).

The parts mentioned in the following examples are parts by weight and percentage data denote wt. %.

EXAMPLES

Components used

| | |
|---|---|
| 30 HBNR 1: | Hydrogenation product of a butadiene/acrylonitrile copolymer having an acrylonitrile content of 34.8% and a degree of hydrogenation of the C=C double bonds of more than 90%, Mooney viscosity of 77 (ML 1 + 4)/100° C. (®Therban 1707 from Bayer AG, Leverkusen). |
| HNBR 2: | Hydrogenation product of a butadiene/acrylonitrile copolymer having an acrylonitrile content of 33.7% and a degree of hydrogenation of the C=C double bonds of 96.4%, Mooney viscosity of 67 (ML 1 + 4)/100° C. (®Therban 1707 S from Bayer AG, Leverkusen). |
| Zinc oxide | ® Zinkoxyd aktiv from Bayer AG, Leverkusen |
| Magnesium oxide | ® Maglite DE from Merck/USA |
| Octylated diphenylamine | ® Vulkanox OCD from Bayer AG, Leverkusen |
| Zinc salt of mercaptobenz-imidazole | ® Vulkanox ZMB 2 from Bayer AG, Leverkusen |
| Vinylsilane | Silan A 172 from Union Carbide Corp./USA |
| Mercaptosilane | Silan A 189 from Union Carbide/USA |
| Triallyl iso-isocyanurate | Diak no. 7 from DuPont, Wilmington/Del., USA |
| Bis-(tert.-butylperoxy-isopropyl)-benzene | ® Perkadox 14/40 from Akzo-Chemie, Duren |
| TMTD[1] | ® Vulkacit Thiuram C from Bayer AG, Leverkusen |
| CBS[2] | ® Vulkacit CZ/MG from Bayer AG, Leverkusen |
| Pyrogenic silicic acid | ® Aerosil 200 V from Degussa, Wesseling |
| Precipitated silicic acid | ® Vulkasil S from Bayer AG, Leverkusen |
| Sodium alumi-nium silicate | ® Vulkasil A1 from Bayer AG, Leverkusen |
| Microtalc | Mistron Vapor from Sierra Talk. Co. Norway |
| Hard kaolin | Dixie Clay from R. T. Vanderbilt |
| Calcined kaolin | Whitetex no. 2 from Freeport Kaolin Co., Gordon, USA |
| Diatomaceous earth | ® Celite 350 from Johns-Manville |
| Chalk | ® Omyalite 90 from Omya, Cologne |

[1] Tetramethyl thiuram disulfide (second accelerator, Crosslinker)
[2] Benzothiazyl-2-cyclohexyl-sulfenamide (second accelerator, Crosslinker)

Compounding 3 different series were prepared, that is to say
Series A: Peroxide vulcanization products of HNBR 1 having a degree of hydrogenation of more than 99%
Series B: Peroxide vulcanization products of HNBR 2 degree of hydrogenation of 96.4%
Series C: Sulphur vulcanization products of HNBR 2 degree of hydrogenation of 96.4%

Compounding was carried out in accordance with the following instructions:

Series A: The rubber is worked on a kneader (filling 100%, temperature 50° C., 27 rpm, plunger pressure 5 bar) for 1 minute, and is kneaded for 2 minutes after addition of anti-ageing agents, metal oxides and ⅓ of the amount of filler, for 2 minutes after addition of silane and a further ⅓ of the amount of filler and for a further 2 minutes after addition of the remaining amount of filler and TAIC. The peroxide is admixed on a mill.

Series B: The rubber is kneaded on a kneader (filling 65%, temperature 40° C., 40/20 rpm, plunger pressuer 8 bar) at 40 rpm for 1 minute after addition of anti-ageing agents, metal oxides, TAIC and ⅓ of the amount of filler, for 1 minute after addition of silane and a further ⅓ of the amount of filler, for ½ minute after addition of the remaining amount of filler and for 1½ minutes at 20 rpm after addition of the peroxide. The material temperature of the mixture should fall here to the extent that the peroxide does not cause premature vulcanization.

Series C: The rubber and sulphur were mixed on a mill at 40° C. for 2 minutes. The mixture was then worked on a kneader (filling 65%, temperature 30° C., 40/20 rpm, plunger pressure 8 bar) at 40 rpm for 1 minute, and kneaded for 1 minute after addition of anti-ageing agent, stearic acid, metal oxides and ⅓ of the amount of filler, for 1 minute after addition of silane and a further ⅓ of the amount of filler, for ½ minute after addition of the remaining amount of filler and for 1½ minutes at 20 rpm after addition of the accelerators. Before addition of the accelerator system, the mixture temperature should be 100° C.; if appropriate, the mixture can be transferred to a mill for the mixing.

The amount of filler (see below) was in each case chosen so that in each case vulcanization products having approximately the same hardness (Shore A) resulted.

Plates having dimensions of 100×100×2 mm were produced from the vulcanizable mixtures described above, the vulcanization conditions being as follows:

Series A: 12 minutes/180° C., conditioning for 6 h/150° C.
Series B: 15 minutes/180° C., conditioning for 6 h/150° C.
Series C: 15 minutes/160° C., no conditioning S2 bars were stamped out of the vulcanized plates for determination of the elongation at break before and after hot air ageing.

The hot air ageing was carried out in a cellular oven.

In the following tables, the relative elongation at break E/Eo is stated, E being the value after and Eo the value before the hot air ageing. The figures quoted for the recipe are parts by weight.

TABLE 1

| | Series A | | | | | | | |
|---|---|---|---|---|---|---|---|---|
| Example no. | Pyrogenic silicic acid 1 | Precipitated silicic acid 2 | Sodium aluminium silicate 3 | Micro-talc 4 | Hard kaolin 5 | Calcined kaolin 6 | Diatomaceous earth 7 | Chalk 8 |
| HNBR 1 | 100 | | | | | | | |
| Magnesium oxide | 2 | | | | | | | |
| Zinc oxide | 2 | | | | | | | |
| Octylated diphenylamine | 1 | → | → | → | → | → | → | → |
| Zinc salt of mercaptobenzimidazole | 0.4 | | | | | | | |
| Vinylsilane | 1.5 | | | | | | | |
| Triallyl isocyanurate | 1.5 | | | | | | | |
| Bis(tert.-butylperoxyisopropyl)benzene | 7 | | | | | | | |
| Filler | 30 | 40 | 55 | 75 | 75 | 55 | 100 | 100 |
| after storage at 150° C./42 days rel. elongation at break E/Eo (%) | 58 | 46 | 74 | 38 | 34 | 12 | dest. | 50 |

TABLE 2

| | Series B | | | | | | | |
|---|---|---|---|---|---|---|---|---|
| Example no. | Pyrogenic silicic acid 1 | Precipitated silicic acid 2 | Sodium aluminium silicate 3 | Micro-talc 4 | Hard kaolin 5 | Calcined kaolin 6 | Diatomaceous earth 7 | Chalk 8 |
| HNBR 2 | 100 | | | | | | | |
| Magnesium oxide | 2 | | | | | | | |
| Zinc oxide | 2 | | | | | | | |
| Octylated diphenylamine | 1 | → | → | → | → | → | → | → |
| Zinc salt of mercaptobenzimidazole | 0.4 | | | | | | | |
| Vinylsilane | 1.5 | | | | | | | |
| Triallyl isocyanurate | 1.5 | | | | | | | |
| Bis(tert.-butylperoxyisopropyl)benzene | 7 | | | | | | | |
| Filler | 25 | 35 | 50 | 65 | 70 | 60 | 70 | 100 |
| after storage at 150° C./21 days rel. elongation at break E/Eo (%) | 57 | 57 | 76 | 41 | 13 | 5 | dest. | 29 |

TABLE 3

| | Series C | | | | | | | |
|---|---|---|---|---|---|---|---|---|
| Example no. | Pyrogenic silicic acid 1 | Precipitated silicic acid 2 | Sodium aluminium silicate 3 | Micro-talc 4 | Hard kaolin 5 | Calcined kaolin 6 | Diatomaceous earth 7 | Chalk 8 |
| HNBR 2 | 100 | | | | | | | |
| Sulphur | 0.51 | | | | | | | |
| Stearic acid | 1 | | | | | | | |
| Magnesium oxide | 2 | | | | | | | |
| Zinc oxide | 2 | | | | | | | |
| Octylated diphenylamine | 1.5 | → | → | → | → | → | → | → |
| Zinc salt of mercaptobenzimidazole | 2 | | | | | | | |
| Mercaptosilane | 1.5 | | | | | | | |
| TMTD | 2 | | | | | | | |
| CBS | 0.5 | | | | | | | |

TABLE 3-continued

| | Series C | | | | | | | |
|---|---|---|---|---|---|---|---|---|
| Example no. | Pyrogenic silicic acid 1 | Precipitated silicic acid 2 | Sodium aluminium silicate 3 | Micro-talc 4 | Hard kaolin 5 | Calcined kaolin 6 | Diatomaceous earth 7 | Chalk 8 |
| Filler | 25 | 35 | 50 | 65 | 70 | 60 | 80 | 100 |
| after storage at 150° C./17 days rel. elongation at break E/Eo (%) | 58 | 37 | 60 | 46 | 29 | 30 | 20 | 50 |

What is claimed is:

1. Rubber compositions, based on hydrogenated nitrile rubber with a degree of hydrogenation of at least 80%, comprising 20 to 200% by weight of sodium aluminium silicate, the weight percent based on the hydrogenated nitrile rubber.

2. Rubber compositions according to claim 1, comprising 35 to 110% by weight of sodium aluminium silicate, the weight percent based on the hydrogenated nitrile rubber.

3. Rubber compositions according to claim 1, wherein the sodium aluminium silicate contains, based on the product dried at 105° C., at least 3% by weight of $Na_2O$, at least 3% by weight of $Al_2O_3$, and at least 60% by weight of $SiO_2$.

4. Rubber compositions according to claim 1, wherein the sodium aluminium silicate contains, based on the product dried at 105° C., 6 to 8% by weight of $Na_2O$, 6 to 8% by weight of $Al_2O_3$ and at least 75% by weight $SiO_2$.

5. A process for the preparation of the rubber compositions according to claim 1 comprising:
mixing the sodium aluminium silicate with the rubber composition.

6. Vulcanized products comprising rubber compositions according to claim 1.

* * * * *